May 17, 1966     H. W. MOORE     3,251,559
COIL WINDING MACHINE

Filed Oct. 12, 1962     2 Sheets-Sheet 1

INVENTOR.
HARRY W. MOORE
BY
Dybvig & Dybvig
HIS ATTORNEYS

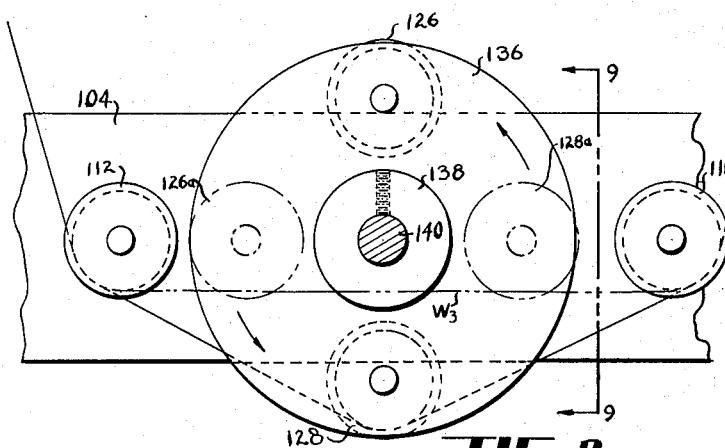
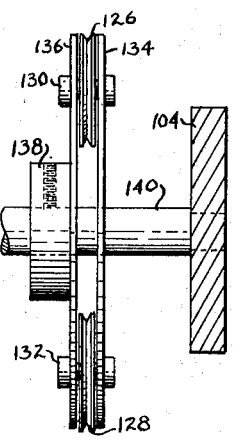
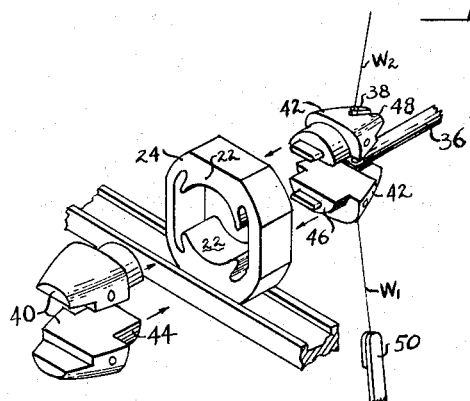
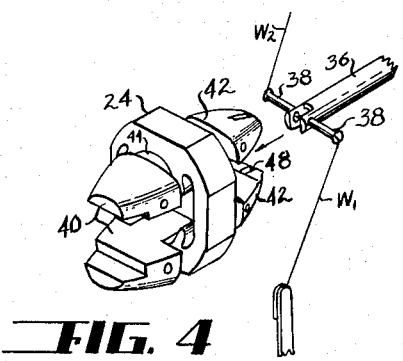
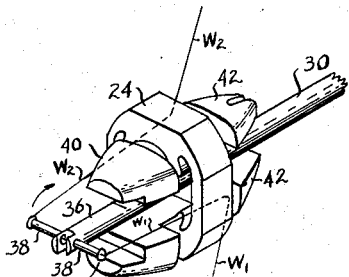
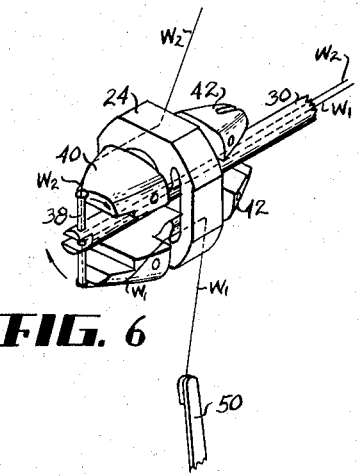
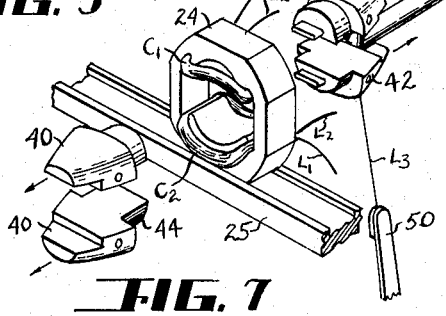
INVENTOR.
HARRY W. MOORE
BY
Dybvig & Dybvig
HIS ATTORNEYS

United States Patent Office 3,251,559
Patented May 17, 1966

3,251,559
COIL WINDING MACHINE
Harry W. Moore, 5051 Kittridge Road, Dayton, Ohio
Filed Oct. 12, 1962, Ser. No. 230,097
1 Claim. (Cl. 242—1.1)

This invention relates to a coil winding machine and more particularly to apparatus for guiding or supplying wire through a winding head. As described herein, the invention is used in association with a shuttle mechanism used in winding coils about pole pieces of a stator frame, the shuttle mechanism being of the type described in my United States Letters Patent Re. 25,281, granted November 6, 1962. It will be apparent from the ensuing description, however, that the invention is not necessarily so limited.

An object of this invention is to provide an improved coil winding machine in which wire is supplied to a coil winding head under a controlled degree of tension.

Another object of this invention is the provision of mechanism for reducing slack formed in wire supplied to a coil forming mechanism.

Other objects and advantages reside in the construction of parts, the combination thereof, the method of manufacture and the mode of operation, as will become more apparent from the following description.

Referring to the drawings.

Figure 1:
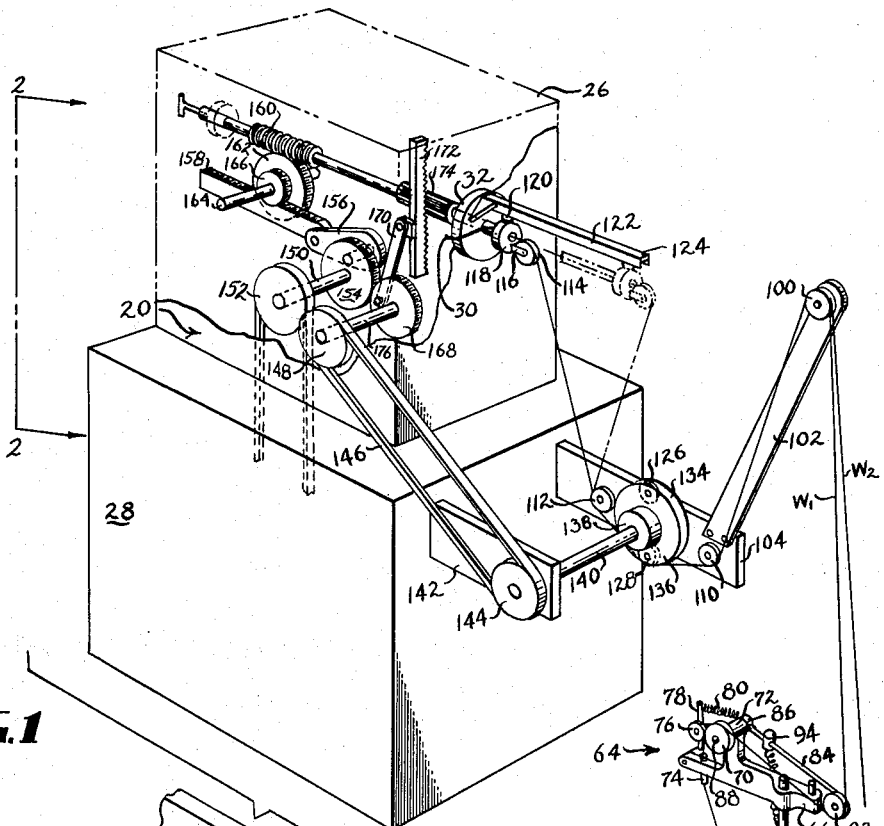
FIGURE 1 is a perspective view schematically illustrating a coil winding machine and further illustrating a wire supply or guide mechanism for use with the coil winding machine. The specific coil winding machine may be of the type described in the aforementioned United States Patent No. 2,953,309.
Figure 2:
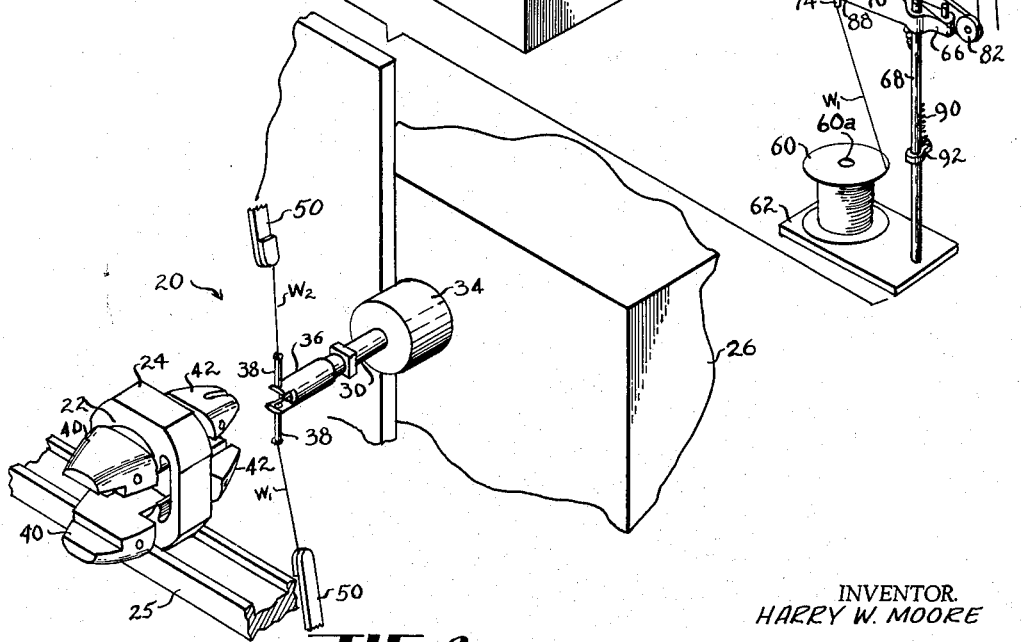
FIGURE 2 is a perspective view of a coil form assembly and a stator frame in association with a coil winding head of the machine of FIGURE 1, as viewed in the direction of arrows 2—2 thereof.

FIGURES 3, 4, 5, 6, and 7 are each partial perspective views schematically illustrating the mode of operation of the coil winding machine shown in FIGURES 1 and 2.

FIGURE 8 is a partial side elevational view of a portion of the wire supply or guide mechanism shown in FIGURE 1.

FIGURE 9 is a cross-sectional view taken along line 9—9 of FIGURE 8.

Referring to the drawings in greater detail, a coil winding machine generally designated 20, of the type designed to wind coils on opposed pole pieces 22 of a stator frame 24 is illustrated in FIGURES 1 and 2. The coil winding machine 20 may include a drive housing 26 mounted upon a suitable base or support 28. A hollow shuttle tube 30 is mounted for oscillatory and reciprocatory movement within bearings 32 and 34 connected respectively to the front and rear of the housing 26. The drive mechanism enclosed within the housing 26 includes a suitable drive for the hollow tube 30, causing it repeatedly to undergo a predetermined series of movements which will be described below. Of course, it is to be understood that the housing 26 and support 28 are merely schematic representations of supports for the tube 30 and other elements of the coil winding machine.

Two strands of wire, designated $W_1$ and $W_2$ are coursed through the hollow tube 30 from the rear portion thereof, which projects rearwardly of the housing 26, to the head or forward portion thereof, which projects forwardly of the housing 26. The manner in which the wire is supplied to the tube 30 will be described below.

As shown in FIGURE 2, the forward or head portion of the tube 30 is provided with a coil winding device comprising a shuttle head 36 including a pair of diametrically opposed wire guides or nozzles 38, one for each strand of the wire $W_1$ and $W_2$. Each strand of wire is adapted to be used in forming a separate coil, one for the upper pole piece 22 of a stator frame 24 positioned on a stator frame support track 25 in front of the shuttle 36 and one for the lower pole piece 22.

Referring to FIGURES 2 through 7, coils, designated $C_1$ and $C_2$ in FIGURE 7 are wound upon the upper and lower pole pieces 22 of the stator frame 24 as follows. As illustrated in FIGURE 3, two pairs of horns or coil forms 40 and 42, having opposed, interfitting reduced portions 44 and 46, respectively, are supported on opposite sides of the stator frame 24. The two coils forms are advanced one toward the other, as indicated by the arrows in FIGURE 3, into the position shown in FIGURES 2 and 4. In this latter position, the arcuate outer surfaces of the coil forms 40 and 42 project longitudinally from the opposite sides of the stator frame 24. The outer surfaces of the reduced portions 44 and 46 are designed to be flush with the innermost surfaces of the pole pieces 22. The mechanisms for supporting, advancing, and interlocking the coil forms 40, 42 form no part of this invention. Such mechanism may be of the type described in the aforementioned Patent No. 2,953,309.

The wire guides or nozzles 38, as shown in FIGURE 3, may initially be vertically oriented and engaged within slots 42 located rearwardly within the coil forms 42. As the forms 42 are advanced toward the stator frame 24, or, alternatively, before the coil forms 40, 42 are advanced into interengagement, the forward ends of the wire strands $W_1$ and $W_2$ are tied down, either automatically or manually. Tie-down clamps for the wire strands are illustrated schematically at 50 in FIGURE 2. The portions of the wire strands between the end of the nozzles 38 and the tie-down clamps 50 will serve as coil leads, as will be apparent to those skilled in the art.

After the coil forms 40 and 42 have taken the position shown in FIGURE 2, the shuttle head 36 is rotated by 90° into that position shown in FIGURE 4. Thereafter, the shuttle head 36 is advanced in the direction of the arrows shown in FIGURE 4 and through the stator frame 24, that is, through the spacing between the upper and lower pairs of coil forms 40, 42. After the nozzles 38 have advanced beyond the rearward or free end portions of the forms 40, the shuttle is rotated by rotation of the tube 30, in the direction of the arrows shown in FIGURES 5 and 6. Due to the arcuate configuration of the outer upper and lower surfaces of the pair of coil forms 40, portions of the wire strands are laid over these forms, as shown in FIGURE 6. After the nozzles 38 have rotated through 180° from the orientation shown in FIGURE 5, the shuttle head 36 is retracted back through the spacing between the upper and lower pairs of forms 40, 42. As the shuttle head 36 is retracted, the wire which is formed around the upper and lower surfaces of the coil forms 40 snaps around the sides of the pole pieces 22 and the ends thereof adjacent the coil forms 40. After the shuttle head 36 has been retracted to the point whereat the nozzles 38 are clear of the rearward or free ends of the coil forms 42, the shuttle is again rotated by 180° in a direction reverse to that indicated in FIGURES 5 and 6. Consequently, portions of the wire strands will be formed over the upper and lower outer surfaces of the forms 42 in a manner similar to that shown in FIGURES 5 and 6. The shuttle head 36 is then advanced through the stator frame 24 once again, whereupon a portion of the coil winding is snapped over the forms 42 into engagement with the pole pieces 22 adjacent thereto.

These shuttle movements repeat continuously during the operation of the machine 20, whereupon the coils $C_1$, $C_2$ shown in FIGURE 7 are formed around the pole pieces 22. The strands of wire which have been connected to the tie-down clamps 50 are then severed, forming leads $L_1$. Similarly, the strands of wire leading from the portion of the coil last formed and directed to the nozzles 38 are severed to form coil leads $L_2$. Either thereafter or simultaneously, additional wire is drawn from the shuttle head 36 to the tie-down clamps 50 to form leads $L_3$ for the next pair of coils to be wound. The coil forms 40, 42 are then retracted, as illustrated in FIGURE 7, from engagement with the stator frame 24, whereupon the frame 24 is removed and an empty stator frame replaced thereby upon the stator frame support track 25.

During the reciprocatory movement of the shuttle head 36 in both directions through the stator frame 24, it will be appreciated that considerable amounts of wire will be rapidly drawn through the hollow tube 30. However, when the reciprocatory movements of the tube 30 cease and the tube is oscillated to form portions of the wire about the coil forms 40, 42, little or no wire will be drawn through the tube 30. As is well known in the coil winding art, the wire supplied to mechanism such as the shuttle head 36 must be supplied under tension. If not, the coils may be wound too loosely, which could be detrimental to the proper operation of the stator. The mechanism made in accordance with this invention for supplying the wire strands W to the shuttle head 36 under substantially uniform tension will now be described in detail.

Referring to FIGURE 1, a supply spool 60 for the strand of wire $W_1$ is shown placed on top of a support base 62 for a wire tensioning or unreeling device, generally designated 64. A pintle (not shown) projecting upwardly from the base 62 passes into a central aperture 60a within the supply spool 60, providing a rotatable mounting therefor. Since the supply spools 60 and the unreeling devices 64 are identical for both strands of wire $W_1$ and $W_2$, only one is illustrated and described herein. The function of the unreeling device 64 is to maintain the wire under a predetermined amount of tension, that is, maintain the wire passing therefrom to the hollow tube 30 relatively taut. The specific unreeling device 64 is patterned after an unreeling device described in United States Patent No. 2,643,075, granted to Kenneth A. Moore on June 23, 1953. However, any of several conventional unreeling devices could be used.

The unreeling device 64 shown in FIGURE 1 includes a generally horizontal bracket member 66 mounted on a vertically oriented standard 68 supported by the base 62. A grooved pulley 70 is mounted for rotation within a sleeve 72 affixed to a vertically, upwardly projecting portion of the bracket member 66. The strand of wire $W_1$ is guided to the pulley 70 through a guide tube 74 seated in the bracket member 64 and several convolutions of the strand W are wound around the pulley 70. A resilient friction wheel 76 mounted on a lever 78 pivotally attached to the forward end of the bracket member 66 is biased into engagement with the grooved pulley 70 and the wire strand wound therearound by means of a spring 80 connected between the upper end of the lever 78 and the sleeve 72. The friction wheel 76 serves to guide wire from the guide tube 74 to the pulley 70 and serves also to retain the wire convolutions on the pulley 70 and retard the rotation of the pulley 70 to some extent. Wire is directed from the pulley 70 to a grooved idler pulley 82 mounted upon a generally horizontally oriented clutch rod 84, which is secured to a sleeve or collar 86 mounted on the same spindle 88 on which the pulley 70 is mounted. A spring 90 normally biases the clutch rod 84 such that its outer end portion upon which the idler pulley 82 is mounted projects downwardly. The lower end of the spring 90 is connected to a fastening member 92 mounted on the standard 68 while its upper end is connected to a collar 94 that is slidably mounted on the rod 84. The wire strand $W_1$ is coursed around one quadrant of the idler pulley 82 and extends vertically upwardly to a first grooved supply pulley 100 mounted for rotation on a generally vertically, upwardly extending bracket 102 connected to a horizontally oriented bracket 104, which in turn is attached in any suitable fashion to the rear of the machine support 28.

The operation of the unreeling device 64 is as follows. When the machine 20 is at rest, the parts occupy the position shown in FIGURE 1. As soon as the hollow tube 30 begins to reciprocate and oscillate as described earlier, the wire strand $W_1$ is drawn by the shuttle head 36, whereupon the idler pulley 82, which acts as a wire follower, is pivoted in a counterclockwise direction, as viewed in FIGURE 1, so as to move upwardly toward the pulley 100. A leather clutch or brake member is mounted on the spindle 88 in such a manner that, with the parts occupying the position shown in FIGURE 1, the pulley 70 is braked so that it will not rotate. As the idler pulley 82 follows the wire upwardly when the shuttle head 36 begins to draw wire, the leather clutch member is gradually released, permitting the pulley 70 to rotate with greater freedom. The operation and construction of the clutch for the pulley 70 is described in detail in the aforementioned United States Patent No. 2,643,075.

It will be appreciated that the unreeling device 64 serves to maintain a predetermined tension on the wire strand $W_1$, since the freedom of rotation of the pulley 70 is determined by the position of the idler pulley 82 and the position of the idler pulley 82 is dependent upon the speed with which the shuttle head 36 draws wire for proper operation thereof. However, it has been found that conventional unreeling devices are not sufficiently responsive to be capable of maintaining substantially constant tension on the wire strands W with the type of shuttle operation described above, if the shuttle head 36 is to operate with adequate speed. Of course, whenever the wire strands are under little or no tension, i.e., they are slack, loose turns of coil windings would appear in the coils $C_1$ and $C_2$. In accordance with this invention, the wire strands are artificially drawn from the tensioning or unreeling device 64 during those time intervals in which the shuttle head 36 is at rest or is oscillating, and are released during those intervals of time in which the shuttle head itself is creating a large wire demand.

The mechanism for creating an artificial demand for wire, termed a "wire take-up device" herein, is shown in FIGURES 1, 8 and 9. The wire take-up device includes spaced, grooved guide pulleys 110 and 112 mounted for rotation upon the horizontally oriented bracket 104. The wire strands $W_1$ and $W_2$ are coursed from the first supply pulley 100 to one of the guide pulleys 110, around the other guide pulley 112 and upwardly to a second grooved supply pulley 114 connected by a bracket 116 to a support collar 118 on the rearward end of the tube 30. The support collar 118 is rotatably mounted relative to the hollow tube 30, but held in a fixed position with respect to its axis by means of an upwardly projecting lug 120 connected thereto, which is held against rotation by vertically oriented guide plates 122 attached to a guide rod 124, which in turn is affixed to the rear bearing 32 on the housing 26.

As indicated by the dot-and-dash line $W_3$ in FIGURE 8, the wire strands $W_1$ and $W_2$ between the spaced guide pulleys 110, 112 will tend to follow a straight line path which is generally tengential to the pulleys 110 and 112. The length of the wire path between the pulleys 110, 112, however, may be increased by means of a pair of wire engaging grooved pulleys 126 and 128 which are mounted for rotation by spindles 130 and 132, respectively, journalled for rotation within apertures in a pair of parallel, spaced mounting plates 134 and 136. The plate 136 is connected by a hub 138 to a driven support shaft 140, which at one end is journalled for rotation within the bracket 104 and at its other end is journalled for rotation within a bracket 142 spaced from and parallel to the bracket 104. A drive pulley or sheave 144 is mounted on the end of the shaft 140 adjacent the mounting bracket 142 and driven by a belt 146 which, in turn, is driven by a pulley 148 drivingly engaged with a portion of the drive mechanism for the hollow tube 30.

The operation of the wire take-up device is as follows. The pulleys 126 and 128 are mounted on diametrically opposed sides of the axis of the driven shaft 140. In the particular embodiment illustrated in the drawings, the pulleys 126 and 128 are the same size as the pulleys 110. Also, the shaft 140 is mounted on an axis which is parallel to and coplanar with the axes of the spindles 130 and 132. As the shaft 140 rotates, the pulleys 126 and 128 alternately engage the portion of the wire strands $W_1$ and $W_2$ passing between the guide pulleys 110 and 112, effectively increasing the length of the path through which the wire strands must travel. For example, as shown in FIGURE 8, the pulley 128 is at its vertically lowermost position, creating a maximum path of travel for the wire strands. Assuming the shaft 140 to be rotating in a counterclockwise direction, the pulley 128 will move to a generally horizontal position indicated by phantom lines 128a while the pulley 126 moves to a horizontal position indicated by phantom lines 126a. When the pulleys are in this latter horizontal position, the wire strands follow the minimum path indicated by the dot-and-dash line $W_3$. Thereafter, the pulley 126 will rotate about the center of the shaft 140 down to the position of the pulley 128 shown in FIGURE 8.

From the foregoing, it will be noted that the pulleys 126 and 128, since their outer surfaces are eccentric to the axis of rotation of the shaft 140 will, during some time intervals, draw the wire passing between the pulleys 110 and 112 downwardly, creating a longer path of travel. During alternate time intervals, the pulleys 126 and 128 will effectively shorten the path of the wire strands. The rotation of the pulleys 126 and 128 is synchronized with the movement of the shuttle head 36 such that one of the pulleys 126 or 128 is creating a longer wire path during those time intervals in which the shuttle head 36 is demanding little or no wire. During those time intervals in which the shuttle head 36 is rapidly drawing wire, one of the pulleys 126 or 128 is moving from its lowermost position toward the horizontal so as to supply part of the demand for the wire of the shuttle head 36. The movement of the shuttle head 36 is so timed as to create equal time intervals of maximum and minimum wire demand. Accordingly, the shaft 140 may rotate at a constant speed such that it makes a 180° rotation during that time interval in which the shuttle head 36 begins to pass in either direction through the stator frame 24, stops and rotates through 180°. During this time interval, the relative position of the pulleys 126 and 128 has reversed; that is, assuming the pulleys to initially be in the position shown in FIGURE 8, the pulley 128 has moved from its vertically lowermost position to its vertically uppermost position. As the shuttle head 36 is moving forward with maximum speed through the stator frame 24, the pulleys 126 and 128 are generally horizontal. On the other hand, as the shuttle head 36 is rotating through 180°, the pulley 126 is at its vertically lowermost position. Accordingly, it is seen that the pulleys 126 and 128 will create an artificial wire demand during those time intervals in which the shuttle head 36 has no wire demand. In other words, the pulleys 126 and 128 will take up the slack in the wire when the shuttle head 36 is not reciprocating, but will effectively furnish wire to the shuttle head 36 as it begins to reciprocate.

The specific take-up device shown in FIGURES 1, 8 and 9 utilizes two pulleys 126 and 128 eccentrically mounted on a common diameter of the shaft 140. It is, of course, obvious that only one wire-engaging pulley would be necessary if the shaft 140 were rotated at twice the speed of rotation which the shaft 140 undergoes when using two wire-engaging pulleys 126 and 128. Further, should the shuttle head or other coil forming mechanism create unevenly spaced time intervals of maximum and minimum wire draw, the shaft 140 could be driven by the belt and pulley arrangement 144, 146 and 148 at a variable speed to accommodate the specific shuttle movement. However, it has been found most desirable to have the shuttle movements such that substantially equal and alternate time intervals of maximum and minimum wire demand result therefrom so that the shaft 140 may rotate at a constant speed. Also, two wire-engaging pulleys 126 and 128 are desirable so that at least one pulley is engaged with the wire strands $W_1$ and $W_2$ at substantially all times.

The drive mechanism for driving the shuttle tube 30, which is synchronized with the movement of the pulley 148, may take a variety of forms. One type of drive mechanism is schematically illustrated in FIGURE 1 as including a main drive shaft 150 drivingly connected to an electric motor (not shown) by means of a belt and pulley arrangement 152. A drive gear 154 supporting an eccentric crank arm 156 is secured to the drive shaft 150. The crank arm 156 is drivingly connected to a rack 158 which is reciprocated thereby along an axis parallel to the axis of the tube 30. The hollow tube 30 is provided with worm gear teeth 160 engaged with a spur gear 162 secured to a shaft 164 to which a pinion 166 engaged with the rack 158 is also secured. The drive gear 154 is meshed with a second drive gear 168 provided with an eccentric crank arm 170 which drives a vertically oriented rack 172 meshed with teeth on a sleeve 174 splined on the shuttle tube 30. The second drive gear 168 is secured to a shaft 176 on which the pulley 148 is mounted. As apparent, upon rotation of the drive shaft 154, the rack 158 will be reciprocated, causing the gear 162 to reciprocate the tube 30 along its longitudinal axis. At the same time, the rack 172 is reciprocated to oscillate the tube 30 along its longitudinal axis. Due to the eccentric mounting of the crank arms 158 and 170, the two racks 158 and 172 are so driven as to cause the alternate reciprocation and oscillation of the tube 30 described above. While the drive shaft 150 is rotating at constant speed, the shaft 172 is also rotating at a constant speed to drive the pulley 148, and hence the take-up device.

Although the presently preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

For use in a coil winding machine having a coil winding device which draws large amounts of wire from a wire tensioning device during spaced time intervals but draws little or no wire during alternate time intervals, a wire take-up device which draws wire from said tensioning device during those time intervals in which said coil winding device does not draw wire, said take-up device comprising: a pair of spaced wire guides over which wire is coursed between said tensioning device and said coil winding device; drive means including a shaft driven in synchronism with said coil winding device; support means including a pair of spaced mounting plates affixed to said shaft for rotation therewith; a pair of pulleys adapted to engage wire passing between said wire guides mounted between said mounting plates on diametrically opposed axes which are parallel to and spaced from the axis of rotation of said shaft and on opposite sides thereof, said shaft being synchronized with said coil winding device for rotating said pulleys about the axis of rotation of said drive shaft causing said pulleys to increase the path of movement of the wire between said wire guides during those time intervals in which said coil winding device is not drawing wire and to decrease said path during those time intervals in which said coil winding device is drawing wire.

References Cited by the Examiner

UNITED STATES PATENTS

| | | | |
|---|---|---|---|
| Re. 25,281 | 11/1962 | Moore | 242—1.1 |
| 1,969,734 | 8/1934 | Eaton | 242—13 |
| 2,643,075 | 6/1953 | Moore | 242—128 |
| 2,657,868 | 11/1953 | Breazeale | 242—45 |
| 2,703,172 | 3/1955 | Nash | 226—114 |
| 3,052,418 | 9/1962 | Groski et al. | 242—1.1 |
| 3,085,457 | 4/1963 | Fischer et al. | 226—114 |

FOREIGN PATENTS

| | | |
|---|---|---|
| 810,959 | 3/1959 | Great Britain. |
| 569,233 | 11/1957 | Italy. |

MERVIN STEIN, *Primary Examiner.*

RUSSELL C. MADER, *Examiner.*